(12) United States Patent (10) Patent No.: US 12,670,684 B2
Zhang (45) Date of Patent: Jun. 30, 2026

(54) PROCESSING CONTROL METHOD, DEVICE, AND MEDIUM FOR POSITIONING MARKER-BASED MACHINING OF PRINTED MATTER

(71) Applicant: MAKEBLOCK CO., LTD., Shenzhen (CN)

(72) Inventor: Yuanxiu Zhang, Shenzhen (CN)

(73) Assignee: MAKEBLOCK CO., LTD., Shenzhen (CN)

( * ) Notice: Subject to any disclaimer, the term of this patent is extended or adjusted under 35 U.S.C. 154(b) by 212 days.

(21) Appl. No.: 18/705,312

(22) PCT Filed: Aug. 31, 2022

(86) PCT No.: PCT/CN2022/116327
§ 371 (c)(1),
(2) Date: Apr. 26, 2024

(87) PCT Pub. No.: WO2023/071512
PCT Pub. Date: May 4, 2023

(65) Prior Publication Data
US 2025/0005878 A1     Jan. 2, 2025

(30) Foreign Application Priority Data
Oct. 26, 2021   (CN) .......................... 202111250792.4

(51) Int. Cl.
  *G06V 10/22*        (2022.01)
  *G06T 7/00*         (2017.01)
  *H04N 1/00*         (2006.01)
(52) U.S. Cl.
  CPC .......... *G06V 10/225* (2022.01); *G06T 7/0004* (2013.01); *H04N 1/00676* (2013.01)

(58) Field of Classification Search
  CPC .... G06V 10/225; G06V 10/24; G06T 7/0004; G06T 7/00; G06T 7/90; G06T 3/40;
  (Continued)

(56) References Cited

U.S. PATENT DOCUMENTS 6,065,400 A    5/2000  Van Weverberg
8,923,656 B1   12/2014 Yokoyama et al.
  (Continued)

FOREIGN PATENT DOCUMENTS

CN      101885152 A   11/2010
CN      102229025 A   11/2011
  (Continued)

OTHER PUBLICATIONS

International Search Report and Written Opinion of the ISA issued in PCT/CN2022/116325, mailed Oct. 26, 2022; ISA/CN.
  (Continued)

*Primary Examiner* — Mia M Thomas
(74) *Attorney, Agent, or Firm* — Harness, Dickey & Pierce, P.L.C.

(57)        ABSTRACT

A processing control method and apparatus, and a device are provided. The method comprises: obtaining a first image comprising a target processing pattern; adding a plurality of positioning identifiers on the periphery of the target processing pattern; obtaining a photography image of a printed matter to be processed which is placed on a processing platform, thereby obtaining a second image, the printed matter to be processed being obtained by performing printing processing on the first image in which the plurality of positioning identifiers are added; performing overlap matching on the first image and the second image in a preset coordinate system according to the plurality of positioning identifiers in the second image; and according to the contour of the target processing pattern in the first image subjected
  (Continued)

to overlap matching, processing the printed matter to be processed, thereby obtaining a target printed matter.

20 Claims, 7 Drawing Sheets

(58) Field of Classification Search
CPC ... G06T 3/60; G06T 7/13; G06T 2207/10004; H04N 1/00676
See application file for complete search history.

(56) References Cited

U.S. PATENT DOCUMENTS

| | | | | |
|---|---|---|---|---|
| 11,694,445 | B2 * | 7/2023 | Jia | G06T 7/337 |
| | | | | 382/103 |
| 12,387,294 | B2 * | 8/2025 | Jin | H04N 25/133 |
| 2010/0063612 | A1 | 3/2010 | Wang et al. | |
| 2010/0158383 | A1 * | 6/2010 | Kuraki | G06T 11/60 |
| | | | | 382/190 |
| 2010/0316222 | A1 * | 12/2010 | Inami | G06T 1/0021 |
| | | | | 380/277 |
| 2011/0019816 | A1 * | 1/2011 | Inami | G06T 1/00 |
| | | | | 380/28 |
| 2011/0319912 | A1 * | 12/2011 | Nishio | A61B 34/20 |
| | | | | 606/130 |
| 2012/0143203 | A1 * | 6/2012 | Nishio | A61B 34/20 |
| | | | | 606/96 |
| 2014/0247278 | A1 * | 9/2014 | Samara | G06T 11/00 |
| | | | | 345/633 |
| 2018/0069984 | A1 * | 3/2018 | Ma | G06V 20/62 |
| 2018/0101951 | A1 * | 4/2018 | Xu | G06V 20/695 |
| 2018/0352205 | A1 * | 12/2018 | Kotani | H04N 9/3182 |
| 2019/0244050 | A1 * | 8/2019 | Lin | G06V 10/17 |
| 2019/0385318 | A1 | 12/2019 | Tomaru et al. | |
| 2020/0211697 | A1 * | 7/2020 | Adiri | G06T 7/90 |
| 2021/0004952 | A1 * | 1/2021 | Chen | G06F 18/23 |
| 2021/0082141 | A1 * | 3/2021 | Muta | G06N 3/08 |
| 2021/0103746 | A1 * | 4/2021 | Chen | G06V 20/58 |
| 2021/0142507 | A1 * | 5/2021 | Dong | G06T 7/13 |
| 2021/0180944 | A1 * | 6/2021 | Tanaka | G01B 11/26 |
| 2022/0188751 | A1 * | 6/2022 | Suzuki | H04N 1/00145 |
| 2022/0398774 | A1 * | 12/2022 | Yeh | G06V 10/82 |
| 2022/0409328 | A1 * | 12/2022 | Wang | A61B 5/245 |
| 2023/0377110 | A1 * | 11/2023 | Pan | G06T 5/20 |
| 2024/0168484 | A1 * | 5/2024 | Chen | G05D 1/0248 |
| 2024/0394937 | A1 * | 11/2024 | Shen | A63F 13/52 |
| 2025/0046051 | A1 * | 2/2025 | Zhang | G06T 7/11 |

FOREIGN PATENT DOCUMENTS

| | | | | |
|---|---|---|---|---|
| CN | 104239909 A | 12/2014 | | |
| CN | 104439698 A | 3/2015 | | |
| CN | 109300165 A | 2/2019 | | |
| CN | 109766063 A | 5/2019 | | |
| CN | 111383267 A | 7/2020 | | |
| CN | 111515522 A | 8/2020 | | |
| CN | 111515523 A | 8/2020 | | |
| CN | 111553364 A | 8/2020 | | |
| CN | 112308842 A | 2/2021 | | |
| CN | 112348126 A | 2/2021 | | |
| CN | 113290313 A | 8/2021 | | |
| CN | 113971661 A | 1/2022 | | |
| CN | 113971662 A | 1/2022 | | |
| JP | 2013198872 A | 10/2013 | | |
| WO | WO-2024160201 A1 * | 8/2024 | | G06T 7/001 |
| WO | WO-2025218564 A1 * | 10/2025 | | G06V 10/235 |

OTHER PUBLICATIONS

Chinese First Office Action regarding Application No. 202111249139.6, dated May 25, 2024.

Xu, Lang et al; "Application and Research of Machine Vision on On-line Inspection for Printed Defect"; School of Mechanical Engineering—University of Shanghai for Science and Technology & Shanghai Publising and Printing Colledge; Mar. 22, 2013; http://www.c-s-a.org.cn; pp. 186-190 (with English abstract).

Xiali, Liu et al; "Intelligent Visual NC Cutting System", 1994-2023 China Academic Journal Electronic Publishing House, http://www.cnki.net; 2020; 5 pages (with English abstract).

International Search Report of the ISA, issued in PCT/CN2022/116327, mailed Nov. 30, 2022; ISA/CN.

* cited by examiner

PROCESSING CONTROL METHOD, DEVICE, AND MEDIUM FOR POSITIONING MARKER-BASED MACHINING OF PRINTED MATTER

CROSS REFERENCE OF RELATED APPLICATION

This application is the national phase of International Application No. PCT/CN2022/116327, titled "PROCESSING CONTROL METHOD AND APPARATUS, AND DEVICE", filed on Aug. 31, 2022, which claims priority to Chinese Patent Application No. 2021112507924, titled "PROCESSING CONTROL METHOD AND APPARATUS, AND DEVICE", filed on Oct. 26, 2021 with the China National Intellectual Property Administration, both of which are incorporated herein by reference in their entireties.

FIELD

The present disclosure relates to the technical field of material processing, and in particular to a processing control method, a processing control apparatus, and a device.

BACKGROUND

A relevant processing device, when cutting a material carrying a target processing pattern, scans the material line by line through color sensors to roughly determine a position of a preset rectangular border where the target processing pattern is located and then to determine a location of the target processing pattern based on the location of the rectangular border. The processing device needs to be provided with color sensors and the precision in determining the location of the target processing pattern is inadequate.

SUMMARY

A processing control method, a processing control apparatus, and a device are provided according to the present disclosure, to solve the technical problem of insufficient precision in cutting a to-be-processed printed matter due to the inaccurate locating of the target processing pattern.

A processing control method is provided according to the present disclosure, including:

acquiring a first image including a target processing pattern;

adding multiple positioning markers at a periphery of the target processing pattern;

capturing an image of a to-be-processed printed matter placed on a processing platform, as a second image, where the to-be-processed printed matter is acquired by printing the first image added with the multiple positioning markers;

fitting the first image into the second image in a preset coordinate system based on the multiple positioning markers in the second image; and processing the to-be-processed printed matter based on a contour of the target processing pattern in the fit first image, to obtain a target printed matter.

In an embodiment of present disclosure, a center of a minimum bounding rectangle of the multiple positioning markers coincides with a center of the first image.

In an embodiment of present disclosure, the fitting the first image into the second image in a preset coordinate system based on the multiple positioning markers in the second image includes:

identifying the multiple positioning markers in the second image; and determining the center and a rotation angle of the minimum bounding rectangle of the multiple positioning markers in the second image based on positions where the multiple positioning markers are located in the preset coordinate system; and fitting the first image into the second image in the preset coordinate system based on the center and the rotation angle of the minimum bounding rectangle of the multiple positioning markers in the second image.

In an embodiment of present disclosure, each of the positioning markers is a cross-shaped positioning marker, and the identifying the multiple positioning markers in the second image includes:

performing binarization on the second image;

performing object detection on the second image subjected to the binarization to obtain an object detection box; and dividing equally the object detection box into nine regions, and determining, based on a proportion of black pixels in each of the nine regions, whether an object in the object detection box is the cross-shaped positioning marker.

In an embodiment of present disclosure, based on the above solutions, the fitting the first image into the second image in the preset coordinate system based on the center and the rotation angle of the minimum bounding rectangle of the multiple positioning markers in the second image includes:

translating the center of the first image to a position where the center of the minimum bounding rectangle of the multiple positioning markers in the second image is located in the preset coordinate system; and rotating the first image in the preset coordinate system by the rotation angle of the minimum bounding rectangle of the multiple positioning markers in the second image, to fit the first image into the second image in the preset coordinate system.

In an embodiment of present disclosure, based on the above solutions, the fitting the first image into the second image in a preset coordinate system based on the multiple positioning markers in the second image includes:

editing the first image to make the target processing pattern in the edited first image in an identical size as the target processing pattern in the second image; and fitting the edited first image into the second image in the preset coordinate system based on the multiple positioning markers in the second image.

In an embodiment of present disclosure, based on the above solutions, the processing the to-be-processed printed matter based on a contour of the target processing pattern in the fit first image, to obtain a target printed matter includes:

extracting the contour of the target processing pattern in the fit first image;

generating GCODE instructions based on the contour of the target processing pattern in the fit first image; and controlling a cutting tool, according to the GCODE instructions, to cut along the contour of the target processing pattern in the to-be-processed printed matter.

A processing control apparatus is provided according to a second aspect of the present disclosure. The processing control apparatus includes:

an image acquiring unit configured to acquire a first image including a target processing pattern;

a unit for adding positioning markers configured to add multiple positioning markers at a periphery of the target processing pattern;

a camera configured to capture an image of a to-be-processed printed matter placed on a processing platform, as a second image, where the to-be-processed printed matter is acquired by printing the first image added with the multiple positioning markers;

a matcher configured to fit the first image into the second image in a preset coordinate system based on the multiple positioning markers in the second image; and a processing controller configured to process the to-be-processed printed matter based on a contour of the target processing pattern in the fit first image, to obtain a target printed matter.

A processing device is provided according to a third aspect of the present disclosure. The processing device includes:

a processing platform configured to carry a to-be-processed printed matter;

a camera configured to capture an image of the to-be-processed printed matter placed on the processing platform;

a cutting tool configured to cut the to-be-processed printed matter; and the foregoing processing control apparatus connected to the camera and the cutting tool.

In some embodiments, based on the above solutions, the cutting tool includes a cutter and/or a laser cutter.

Other features and advantages of the present disclosure will become apparent from the following detailed description, or in part, be learned by practice of the present disclosure.

It is to be understood that both the foregoing general description and the following detailed description are exemplary and explanatory only and are not restrictive of the present disclosure.

BRIEF DESCRIPTION OF THE DRAWINGS

The drawings, which are incorporated in and constitute a part of this specification, illustrate embodiments consistent with the present disclosure and are used to explain the principles of the present disclosure together with the description. Apparently, the drawings used in the following description show merely some embodiments of the present disclosure, and those skilled in the art can obtain other drawings based on these drawings without creative efforts.

DETAILED DESCRIPTION OF EMBODIMENTS

Figure 1:
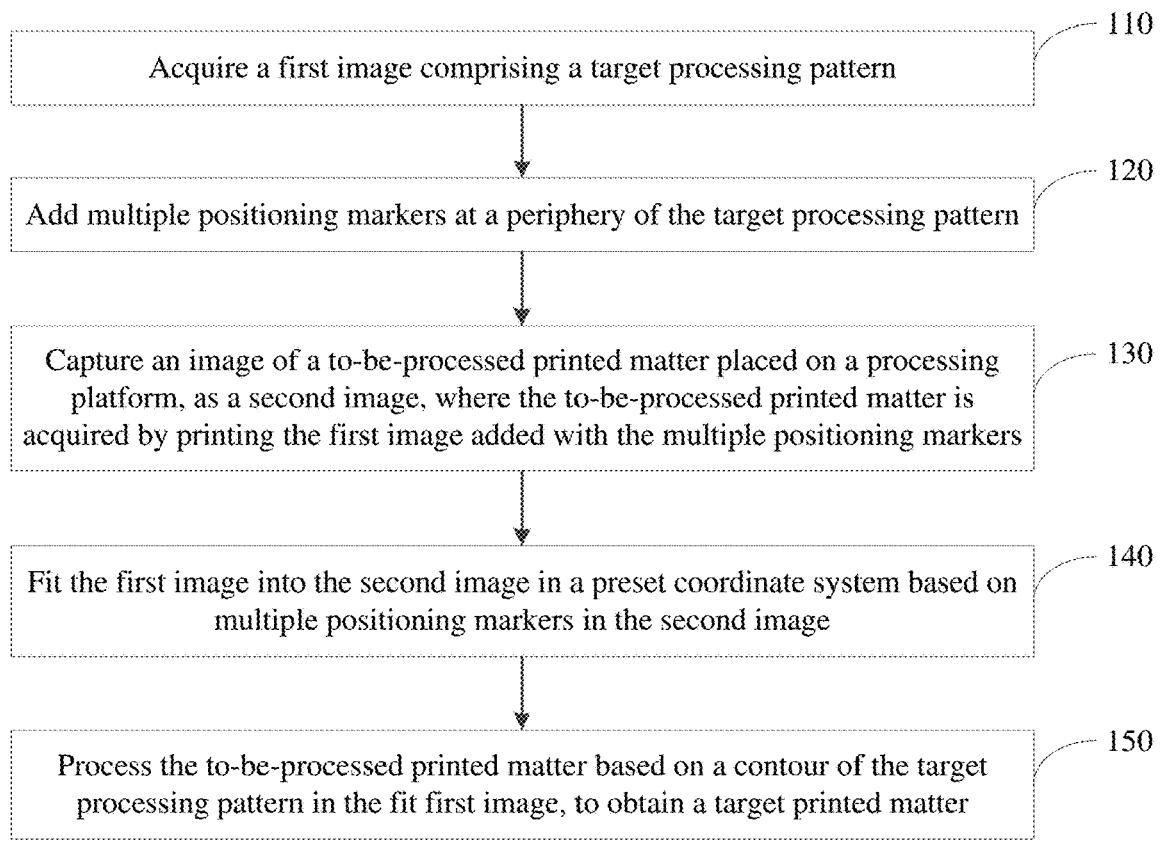
FIG. 1 is a schematic flowchart illustrating a processing control method according to an embodiment of the present disclosure.

The technical solutions according to the embodiments of the present application are described clearly and completely as follows in conjunction with the drawings. It is apparent that the described embodiments are only a few rather than all of the embodiments according to the present application. All other embodiments acquired by those skilled in the art based on the embodiments of the present disclosure without any creative effort shall fall into the protection scope of the present disclosure.

In addition, the described characteristics, structures, or features may be combined in one or more embodiments in any appropriate manner. In the following descriptions, a lot of specific details are provided to give a comprehensive understanding of the embodiments of the present disclosure. However, those skilled in the art are to be aware that, the technical solutions in the present disclosure may be implemented without one or more of the particular details, or another method, unit, device, or step may be used. In other cases, well-known methods, devices, implementations, or operations are not shown or described in detail, in order to avoid obscuring aspects of the present disclosure.

The block diagrams in the drawings show merely functional entities and do not necessarily correspond to physically independent entities. In other words, such functional entities may be implemented in the form of software, or implemented in one or more hardware modules or integrated circuits, or implemented in different networks and/or processor apparatus and/or microcontroller apparatus.

The flowcharts shown in the drawings are merely for exemplary descriptions and do not necessarily include all of the content and operations/steps, nor are they necessarily performed in the sequence described. For example, some operations/steps may be further divided, and some operations/steps may be combined or partially combined. Therefore, an actual execution sequence may be changed according to an actual situation.

In the description of the present disclosure, the terms such as "first" and "second" are merely used for descriptive purposes, and should not be understood as indicating or implying relative importance or implicitly indicating the number of indicated technical features. Therefore, the feature defined by "first" and "second" may explicitly or implicitly be one or more in number. In addition, in the description of the present disclosure, "multiple or a plurality of" means two or more than two unless otherwise stated.

As shown in FIG. 1, the method includes at least the following steps 110 to 150.

In step 110, a first image including a target processing pattern is acquired.

In a specific implementation, a high-resolution image is selected as the first image. Correspondingly, a contour of the target processing pattern is clearer, providing a basis for subsequently cutting a to-be-processed printed matter by using the contour of the target processing pattern in the first image.

In step 120, multiple positioning markers are added at a periphery of the target processing pattern.

The positioning markers should not overlay on the target processing pattern to avoid affecting the effect of subsequent printing. The positioning markers may be in various shapes, such as in a cross shape, a triangle shape, a circle shape, and a star shape. The number of the positioning markers is greater than or equal to two.

In step 130, an image of the to-be-processed printed matter placed on a processing platform is captured, as a second image. The to-be-processed printed matter is acquired by printing the first image added with the multiple positioning markers.

In a specific implementation, layout processing is performed on the first image added with the positioning markers, and the first image subjected to the layout processing is printed or spray-painted, to obtain the to-be-processed printed matter.

In an application scenario of making stickers popular in children, the first image may include multiple cartoon patterns. Layout processing is performed for the cartoon figures, and then the first image is printed by a printing machine or a spray painting machine to obtain a sticker sheet. The sticker sheet has two layers. An upper layer is to-be-processed material including the cartoon patterns, and a lower layer is a plastic base. The cartoon patterns are spaced and are to be cut in subsequent steps.

In a specific implementation, via a graphical interactive interface, users may perform the layout processing on the target processing pattern in the first image, add the positioning markers to the first image, view the second image and preview an effect image of the processed printed matter, so that the whole processing process is visible to the users, thereby improving the user experience.

It should be noted that the to-be-processed printed matter is placed on the processing platform by manual operation or a robot arm, and a position where the to-be-processed printed matter is placed on the processing platform may be unfixed. The second image may indicate the position where the to-be-processed printed matter is located on the processing platform. A target pattern on the to-be-processed printed matter has a mapping relationship with a target pattern in the second image. The processing platform may be a printing space of a 3D printer, a processing platform of a laser cutter, or the like.

Figure 2:
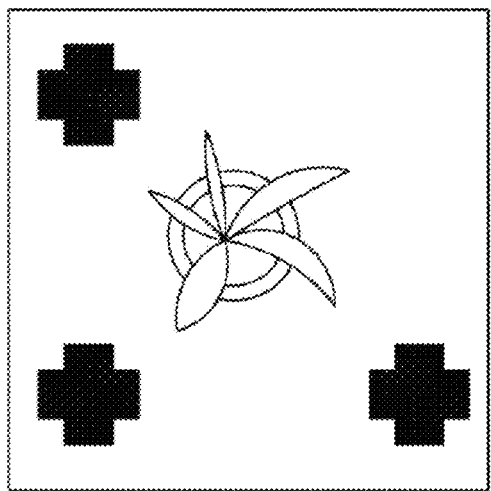
FIG. 2 is a schematic diagram illustrating a second image according to an embodiment of the present disclosure.

As shown in FIG. 2, the second image is a photo of the to-be-processed printed matter placed on the processing platform captured by a camera. The to-be-processed printed matter includes three cross-shaped positioning markers and a target processing pattern presenting a pot plant.

In step 140, the first image is fit into the second image in a preset coordinate system based on the multiple positioning markers in the second image.

When the to-be-processed printed matter is placed in the printing space of the 3D printer, the second image is captured by a low-resolution camera in the 3D printer. In this case, the contour of the target processing pattern in the second image may be unclear, while the contour of the target processing pattern in the first image is clearer. Therefore, the contour of the target processing pattern in the first image is suitable to be used as a cutting trajectory.

It should be noted that the second image indicates the position where the to-be-processed printed matter is located on the processing platform. A position where the second image is located in the preset coordinate system has a mapping relationship with the position where the to-be-processed printed matter is located on the processing platform. Therefore, to use the contour of the target processing pattern in the first image as the cutting trajectory, it is needed to fit the first image into the second image in the preset coordinate system, to allow the target processing pattern in the first image coincides with the target processing pattern in the second image.

In step 150, the to-be-processed printed matter is processed based on the contour of the target processing pattern in the fit first image, to obtain a target printed matter.

The to-be-processed printed matter is processed through cutting, carving, or indentation. In practice, the to-be-processed printed matter may be processed in various manners as desirable.

In the application scenario of making stickers popular in children, a cutting tool cuts along the contours of the cartoon patterns in the to-be-processed material, to cut off the blanks between the cartoon patterns in the to-be-processed material.

According to the embodiment of the present disclosure, the first image is fit into the image of the to-be-processed printed matter based on the positioning markers, so that the to-be-processed printed matter is cut by using the contour of the target processing pattern in the first image, thereby improving the cutting accuracy.

It should be noted that fitting the first image into the second image in the preset coordinate system is to make the target processing pattern in the first image coincide with the target processing pattern in the second image, so as to cut the to-be-processed printed matter by following the contour of the target processing pattern in the first image. Therefore, the fitting may be achieved by fitting a center of the first image with a center of a minimum bounding rectangle of the multiple positioning markers in the second image. In a specific implementation, the center of the minimum bounding rectangle of the multiple positioning markers may be determined as the center of the first image when adding the positioning markers to the first image.

Figure 3:
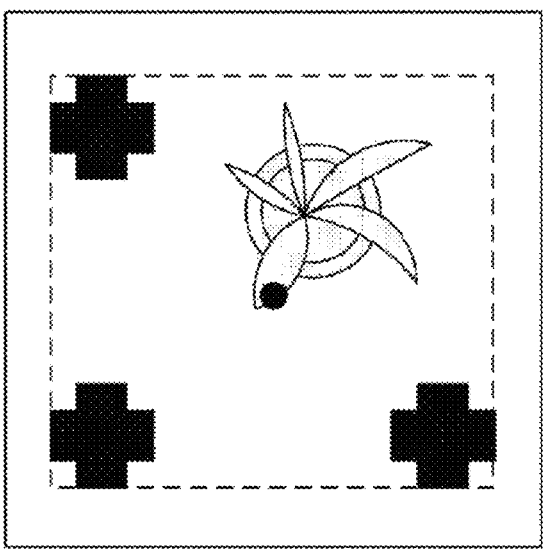
FIG. 3 is a schematic diagram illustrating a first image according to an embodiment of the present disclosure.

As shown in FIG. 3, the positioning markers each are in a cross shape, and the center of the minimum bounding rectangle of the multiple positioning markers coincides with the center of the first image. In practice, at least three positioning markers are utilized.

Figure 4:
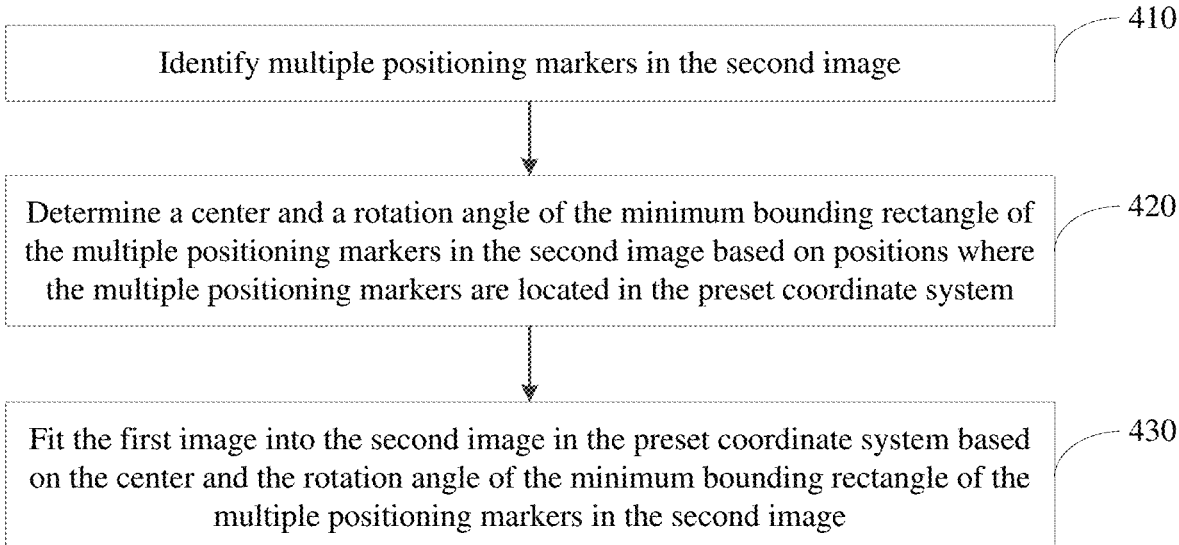
FIG. 4 is a schematic flowchart illustrating image fitting according to an embodiment of the present disclosure.

As shown in FIG. 4, the processing control method further includes at least the following steps 410 to 430.

In step 410, multiple positioning markers in the second image are identified.

In a specific implementation, the positioning markers in the second image are determined through extracting features of the multiple positioning markers by using a convolutional neural network and classifying targets in the second image.

In step 420, the center and a rotation angle of the minimum bounding rectangle of the multiple positioning markers in the second image are determined based on positions where the multiple positioning markers are located in the preset coordinate system.

Figure 5:
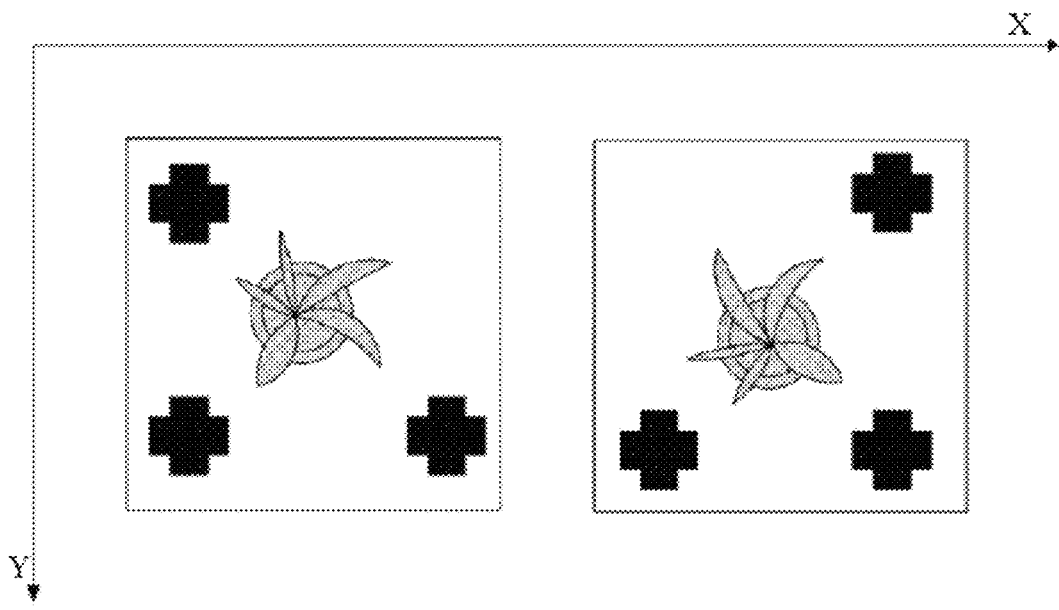
FIG. 5 is a schematic comparative diagram illustrating a first image provided with multiple positioning markers and a second image provided with multiple positioning markers according to an embodiment of the present disclosure.

The to-be-processed printed matter is placed on the processing platform by manual operation or the robot arm, and the position where the to-be-processed printed matter is placed on the processing platform is unfixed. As shown in FIG. 5, assuming that the preset coordinate system is established for a horizontal direction and a vertical direction, the first image added with multiple positioning markers is on the left, and the second image is on the right, it may be determined, based on the positions where the multiple positioning markers are located in the preset coordinate system, that the minimum bounding rectangle of the multiple positioning markers in the second image is rotated by 90 degrees relative to the first image.

In step 430, the first image is fit into the second image in the preset coordinate system based on the center and the rotation angle of the minimum bounding rectangle of the multiple positioning markers in the second image.

After the center and the rotation angle of the minimum bounding rectangle of the multiple positioning markers in the second image are determined, the first image is moved to fit into the second image by: translating the center of the first image to a position where the center of the minimum bounding rectangle of the multiple positioning markers in the second image is located in the preset coordinate system; and rotating the first image in the preset coordinate system by the rotation angle of the minimum bounding rectangle of the multiple positioning markers in the second image.

By fitting the first image into the second image in the preset coordinate system, the target processing pattern in the first image coincides with the target processing pattern in the second image, for subsequently making use of the contour of the target processing pattern in the fit first image.

In an embodiment, cross-shaped positioning markers, in which the horizontal bar and the vertical bar are identical in size and a length of the horizontal bar is three times a width of the horizontal bar, may be used.

Figure 6:
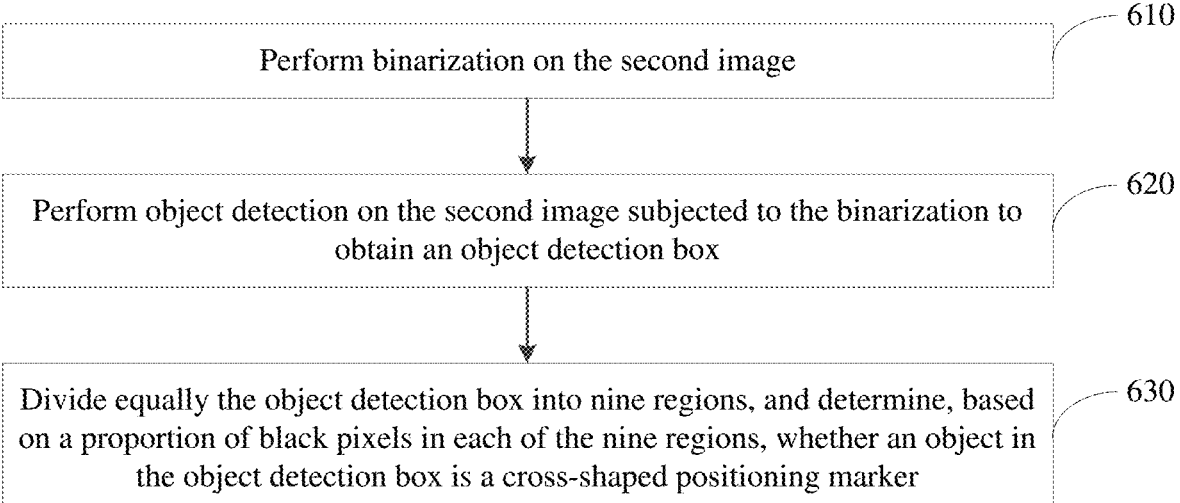
FIG. 6 is a schematic flowchart illustrating identification of a cross-shaped positioning marker according to an embodiment of the present disclosure.

As shown in FIG. 6, the processing control method further includes at least the following steps 610 to 630.

In step 610, binarization is performed on the second image.

Image binarization is a process in which gray scales of pixels on the image are set to 0 or 255, to present the image in black and white. The image binarization greatly reduces the amount of data in the image, thereby highlighting the contour of the target in the image.

In step 620, object detection is performed on the second image subjected to the binarization to obtain an object detection box.

The object detection box is a bounding box of the target in the image or a minimum bounding rectangle of the target. In a specific implementation, object detection is performed on the second image by using an object detection algorithm based on deep learning.

In step 630, the object detection box is divided equally into nine regions, and it is determined, based on a proportion of black pixels in each of the nine regions, whether an object in the object detection box is the positioning marker in the cross shape.

Figure 7:
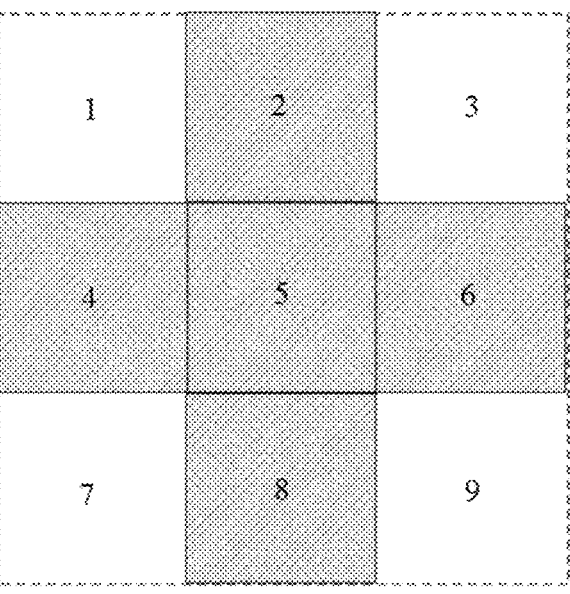
FIG. 7 is a schematic diagram illustrating a cross-shaped positioning marker according to an embodiment of the present disclosure.

As shown in FIG. 7, the object detection box of a cross-shaped positioning marker is equally divided into nine regions arranged in an order of region 1 to region 9. For the second image already subjected to binarization, in a case that a proportion of black pixels in each of the region 1, the region 3, the region 7, and the region 9 is less than a first threshold, and a proportion of black pixels in each of the region 2, the region 4, the region 5, the region 6, and region 8 is greater than a second threshold, it is determined that the object in the object detection box is the cross-shaped positioning marker. In practice, the first threshold and the second threshold are determined according to the actual situation, for example, the first threshold is 15%, and the second threshold is 85%.

In some embodiments of the present disclosure, based on the above solutions, the fitting the first image into the second image in the preset coordinate system based on the multiple positioning markers in the second image includes:

editing the first image to make the target processing pattern in the edited first image in an identical size as the target processing pattern in the second image; and fitting the edited first image into the second image in the preset coordinate system based on the multiple positioning markers in the second image.

The size of the first image is edited, in order to fit the first image into the second image. In a specific implementation, the size of the first image is edited through interaction editing.

Figure 8:
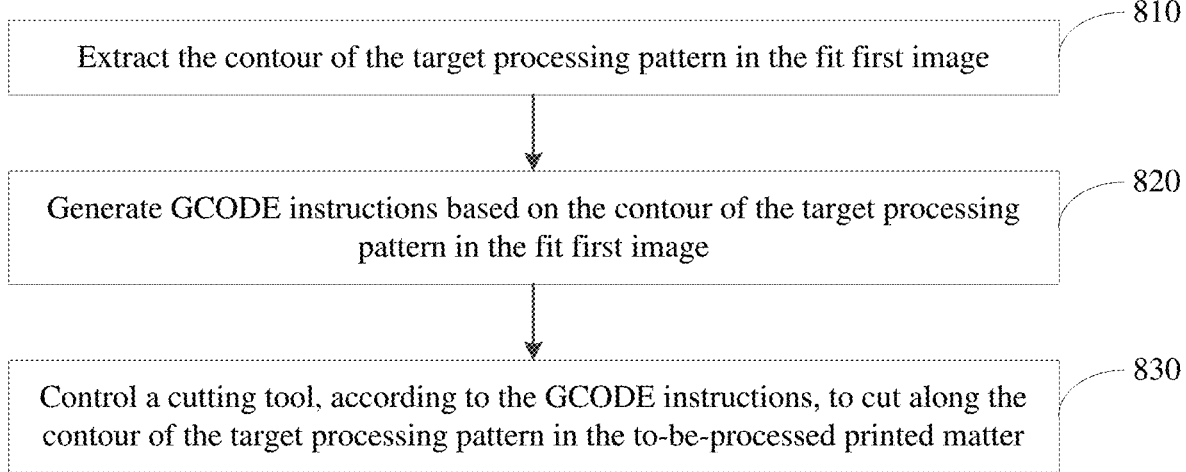
FIG. 8 is a schematic flowchart illustrating a processing method according to an embodiment of the present disclosure.

As shown in FIG. 8, the processing control method further includes at least the following steps 810 to 830.

In step 810, the contour of the target processing pattern in the fit first image is extracted.

In a specific implementation, the contour of the target processing pattern in the first image is extracted by using a polygon-based bitmap contour vectorization algorithm (Potrace).

In step 820, GCODE instructions are generated based on the contour of the target processing pattern in the fit first image.

Figure 9:
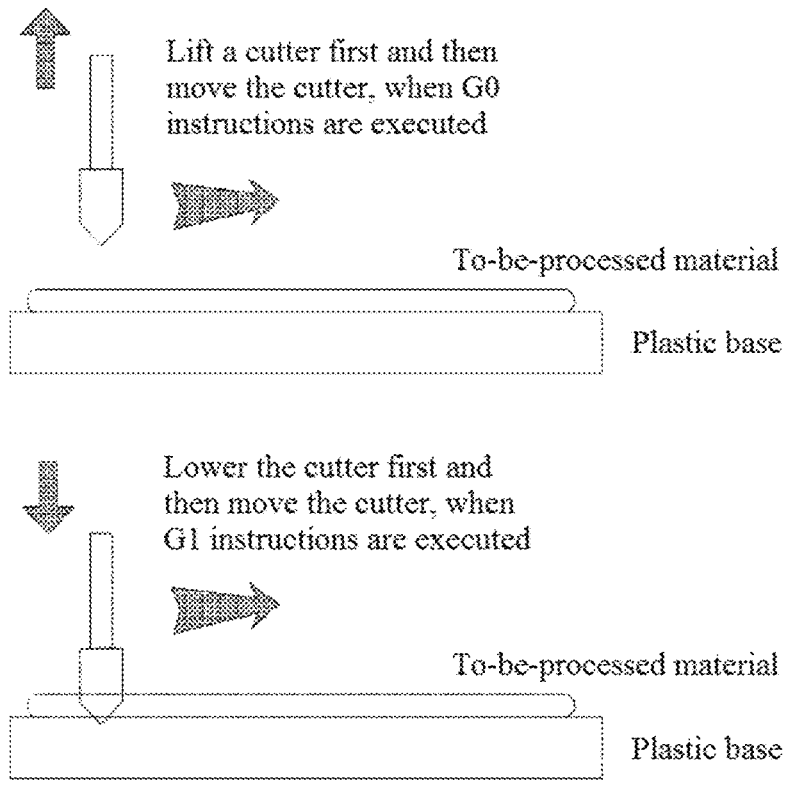
FIG. 9 is a schematic diagram illustrating operation of a cutting tool according to an embodiment of the present disclosure.

The GCODE instructions can be understood by firmware of the 3D printer, and is used to control the cutting tool to move. The GCODE instructions include G0 instructions or G1 instructions. As shown in FIG. 9, when the cutting tool cuts the to-be-processed material, in a case that the cutting tool executes the G0 instructions, a cutter is lifted first and then moved; and in a case that the cutting tool executes the G1 instructions, the cutter is lowered first and then moved.

Figure 10:
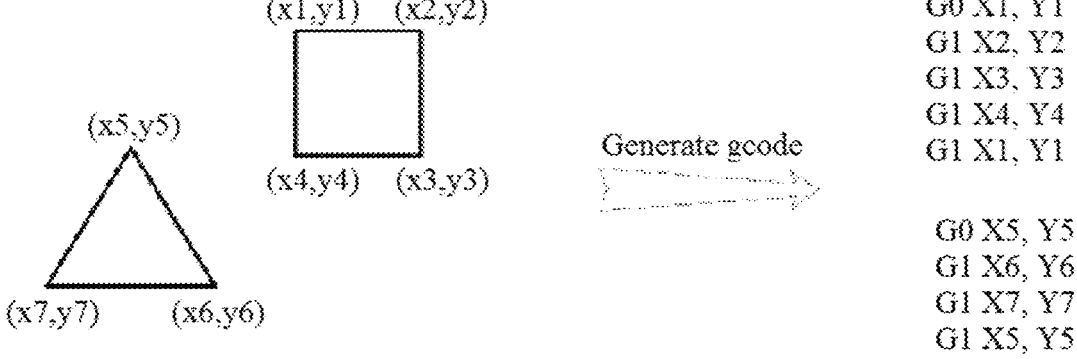
FIG. 10 is schematic diagram illustrating generation of GCODE instructions according to an embodiment of the present disclosure.

As shown in FIG. 10, a coordinate of a square and a coordinate of a triangle are known on the left side. In a case that the cutting tool cuts the square first and then cuts the triangle, the GCODE instructions on the right side are generated. The cutting tool first lifts the cutter to a position (x1, y1), i.e., a vertex of the square, and then moves the cutter along a contour of the square. After the square is cut, the cutting tool first lifts and moves the cutter to a position (x5, y5), i.e., a vertex of the triangle, and then moves the cutter along a contour of the triangle.

In step 830, the cutting tool is controlled, according to the GCODE instructions, to cut along the contour of the target processing pattern in the to-be-processed printed matter.

Figure 11:
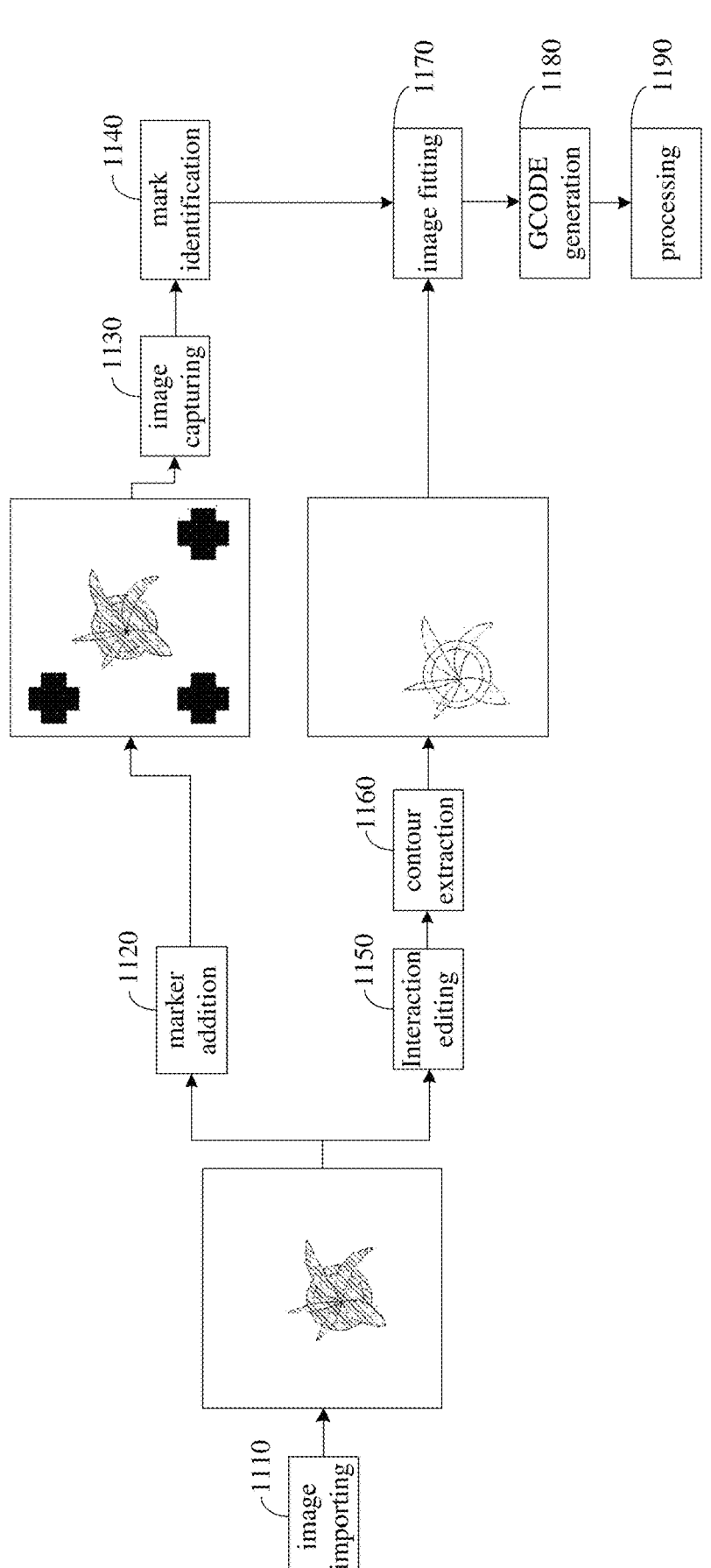
FIG. 11 is a schematic flowchart illustrating a processing control method according to another embodiment of the present disclosure.

As shown in FIG. 11, the processing control method further includes at least the following steps 1110 to 1190.

In step 1110, image importing: a first image including a target processing pattern is acquired.

In a specific implementation, users may import a high-resolution image in a format such as jpg, png or bmp.

In step 1120, marker addition: multiple positioning markers are added at a periphery of the target processing pattern.

In step 1130, image capturing: an image of a to-be-processed printed matter placed on a processing platform is captured, as a second image. The to-be-processed printed matter is acquired by printing the first image added with the multiple positioning markers.

In step 1140, mark identification: the multiple positioning markers in the second image are identified, and a center and a rotation angle of a minimum bounding rectangle of the multiple positioning markers in the second image are determined.

In step 1150, interaction editing: the first image is edited to make the target processing pattern in the edited first image in an identical size as the target processing pattern in the second image.

In step 1160, contour extraction: the contour of the target processing pattern in the edited first image is extracted.

In step 1170, image fitting: the first image is fit into the second image in the preset coordinate system based on the multiple positioning markers in the second image.

In step 1180, GCODE generation: GCODE instructions are generated based on the contour of the target processing pattern in the fit first image.

In step 1190, processing: the to-be-processed printed matter is processed to obtain a target printed matter.

According to the embodiments of the present disclosure, the first image is fit into the image of the to-be-processed printed matter based on the positioning markers, so that the to-be-processed printed matter is cut by using the contour of the target processing pattern in the first image, thereby improving the cutting accuracy.

A processing control apparatus according to an embodiment of the present disclosure is described below. The processing control apparatus may be configured to perform the processing control method according to the foregoing embodiments. For details not disclosed in the embodiment of the processing control apparatus according to the present disclosure, reference may be made to the embodiments of the processing control method according to the present disclosure.

Figure 12:
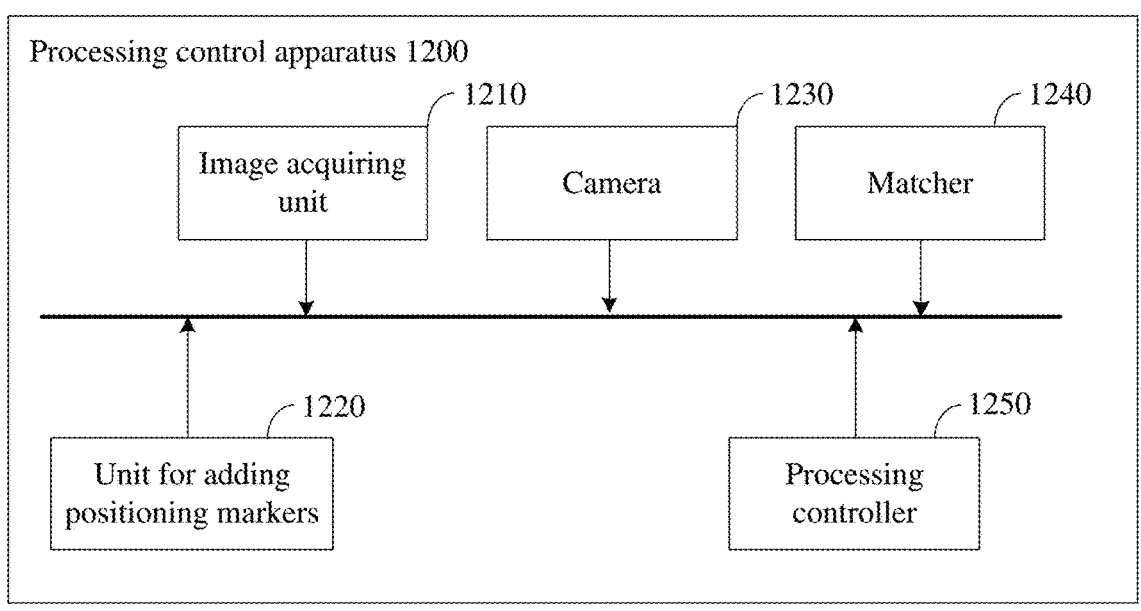
FIG. 12 is a schematic structural diagram illustrating a processing control apparatus according to an embodiment of the present disclosure.

As shown in FIG. 12, the processing control apparatus 1200 at least includes an image acquiring unit 1210, a unit 1220 for adding positioning markers, a camera 1230, a matcher 1240 and a processing controller 1250.

The image acquiring unit 1210 is configured to acquire a first image including a target processing pattern.

The unit 1220 for adding positioning markers is configured to add multiple positioning markers at a periphery of the target processing pattern.

The camera 1230 is configured to capture an image of a to-be-processed printed matter placed on a processing platform, as a second image, where the to-be-processed printed matter is acquired by printing the first image added with the multiple positioning markers.

The matcher 1240 is configured to fit the first image into the second image in a preset coordinate system based on the multiple positioning markers in the second image.

The processing controller 1250 is configured to process the to-be-processed printed matter based on a contour of the target processing pattern in the fit first image, to obtain a target printed matter.

A processing device is further provided according to an embodiment of the present disclosure. The processing device includes:

a processing platform for carrying a to-be-processed printed matter;

a camera configured to capture an image of the to-be-processed printed matter placed on the processing platform;

a cutting tool configured to cut the to-be-processed printed matter; and the foregoing processing control apparatus connected to the camera and the cutting tool.

In a specific implementation, the cutting tool includes a laser cutter or a cutter.

Figure 13:
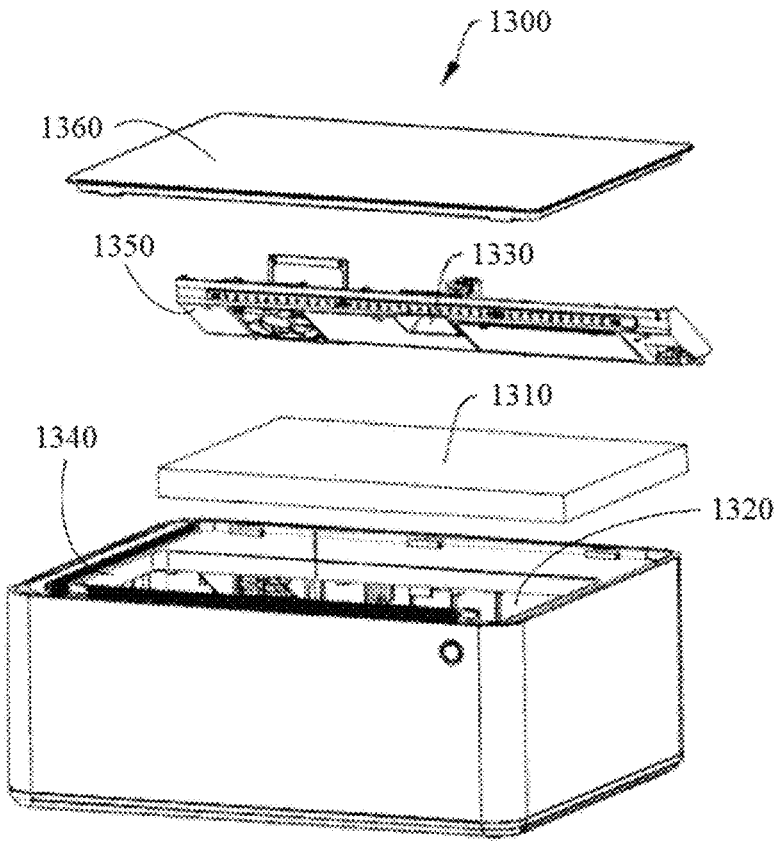
FIG. 13 is a schematic structural diagram illustrating a processing device according to an embodiment of the present disclosure.

As shown in FIG. 13, the processing device is a laser and cutting processing device 1300. The laser and cutting processing device 1300 includes a frame 1340. An enclosed processing space 1320 is defined inside the frame 1340. The processing space 1320 is configured for accommodating and processing a work piece to be processed (for example, the to-be-processed printed matter). The frame 1340 is provided with a top opening that is in communication with the processing space 1320. The frame 1340 is further connected to a cover plate 1360. The cover plate 1360 covers the opening in a rotatable manner. The to-be-processed work piece is placed or removed by users via the opening. The frame 1340 is formed by a base plate, side plates, and the like. In the frame 1340, there is provided with a track and the processing apparatus arranged on the track. The processing apparatus is movable inside the processing space 1320 along an X-axis direction, a Y-axis direction, and a Z-axis direction. The processing apparatus is provided with a laser and a cutter, so as to move and carve and cut the work piece with the laser, or cut and scratch the work piece with the cutter, achieving desktop-level and miniaturized settings of the laser and cutting processing device.

A camera 1330 is arranged inside the laser and cutting processing device. The bottom of the processing space 1320 is defined as the processing platform 1310. The camera 1330 faces the processing platform 1310 for capturing pictures during the processing. For example, the camera 1330 captures the image of the to-be-processed printed matter as the second image.

The laser and cutting processing device 1300 according to the embodiment of the present disclosure includes a mounting bracket 1350 arranged in the frame 1340. The camera 1330 is arranged on the mounting bracket 1350 in the laser and cutting processing device 1300. Compared with the solution where the camera 1330 is arranged on the cover plate 1360, the solution in the embodiment of the present disclosure can simplify wiring of the camera 1330, effectively prevent the cover plate 1360 from being deformed, and prevent the camera 1330 from moving due to repeatedly opening and closing, thereby avoiding debugging before laser processing and improving the processing accuracy and the processing efficiency. In addition, compared with the solution where the camera 1330 is arranged on the cover plate 1360, arranging the camera 1330 on the mounting bracket 1350 can lower the overall height of the entire laser and cutting processing device 900 while ensuring capture the image of the entire to-be-processed work piece, thereby facilitating users to place the work piece to be processed (when the user places the work piece to be processed, the user's hand will go deep into the processing space 1320 or the frame 1340; and if the laser and cutting processing device 1300 is too high, it is inconvenient for user operation).

The camera 1330 is arranged in the middle of the mounting bracket 1350. The camera 1330 is arranged in the middle of the mounting bracket 1350, so as to facilitate capturing the image of the entire to-be-processed work piece. The term "middle" in the present disclosure refers to a central position of a component, or a part close to the central position. Optionally, the camera is arranged at the bottom of an accommodating groove. This can better prevent the camera from accidentally injuring when the work piece is processed, and has a better dust-proof effect, improving the service life of the camera. The equivalent circle diameter of the accommodating groove decreases gradually from the arranging surface to the bottom of the accommodating groove, which can better prevent the side wall of the accommodating groove from affecting the shooting effect of the camera.

A storage medium is further provided according to an embodiment of the present disclosure. The storage medium includes a program or instructions, when being executed, for implementing the processing control method according to any one of the embodiments of the present disclosure.

Finally, it should be noted that, those skilled in the art should understand that the embodiments of the present disclosure may be provided as methods, systems, or computer program products. Accordingly, the present disclosure can take the form of an entire hardware embodiment, an entire software embodiment, or an embodiment combining software and hardware aspects. Furthermore, the present disclosure may take the form of a computer program product embodied on one or more computer-usable storage media (including but not limited to disk storage, optical storage, etc.) having computer-usable program code embodied therein.

The present disclosure is described with reference to flowcharts and/or block diagrams of methods, apparatus (systems), and computer program products according to the present disclosure. It should be understood that each process and/or block in the flowcharts and/or block diagrams, and a combination of processes and/or blocks in the flowcharts and/or block diagrams can be implemented by computer program instructions. These computer program instructions may be provided to a general purpose computer, special purpose computer, embedded processor, or processor of other programmable data processing devices to produce a machine, such that the instructions executed by the processor of the computer or other programmable data processing devices can produce an apparatus for realizing the functions specified in one or more procedures of the flowcharts and/or one or more blocks of the block diagrams.

These computer program instructions may also be stored in a computer-readable memory capable of directing a computer or other programmable data processing device to operate in a specific manner, such that the instructions stored in the computer-readable memory produce an article including an instruction apparatus. The instruction apparatus realizes the function specified in one or more procedures of the flowcharts and/or one or more blocks of the block diagrams.

Specific embodiments of the present disclosure are described above, but the scope of the present disclosure is not limited thereto. Any changes or substitutions that can be easily conceived by those skilled in the art within the technical scope disclosed in the present disclosure fall into the scope of the present disclosure. Therefore, the scope of the present disclosure is defined by the claims.

The invention claimed is:

1. A processing control method, comprising:
   acquiring a first image comprising a target processing pattern;
   determining a plurality of positioning markers based on the first image;
   capturing an image of a to-be-processed printed matter placed on a processing platform, as a second image, wherein the to-be-processed printed matter is generated based on the first image and the plurality of positioning markers;
   fitting the first image into the second image in a preset coordinate system based on the plurality of positioning markers in the second image; and
   processing the to-be-processed printed matter based on at least part of features of the target processing pattern in the fit first image.

2. The processing control method according to claim 1, wherein a center of a minimum bounding rectangle of the plurality of positioning markers coincides with a center of the first image.

3. The processing control method according to claim 1, wherein the fitting the first image into the second image in the preset coordinate system based on the plurality of positioning markers in the second image comprises:
   identifying the plurality of positioning markers in the second image; and
   determining, based on positions where the plurality of positioning markers are located in the preset coordinate system, a position of the first image in the preset coordinate system, to fit the first image into the second image in the preset coordinate system.

4. The processing control method according to claim 3, wherein identifying the plurality of positioning markers in the second image comprises:
   performing binarization on the second image;
   performing object detection on the second image subjected to the binarization to obtain an object detection box; and
   determining, based on characteristics of at least part of the positioning markers, whether an object in the object detection box is the positioning marker.

5. The processing control method according to claim 4, wherein at least one of the positioning markers is a cross-shaped positioning marker, and determining whether the object in the object detection box is the positioning marker, comprises:
   dividing equally the object detection box into nine regions, and determining, based on a proportion of black pixels in each of the nine regions whether the object in the object detection box is the cross-shaped positioning marker.

6. The processing control method according to claim 3, wherein a center of a minimum bounding rectangle of the plurality of positioning markers coincides with a center of the first image, and the determining, based on positions where the plurality of positioning markers are located in the preset coordinate system, the position of the first image in the preset coordinate system, to fit the first image into the second image in the preset coordinate system, comprises:
   determining the center and a rotation angle of the minimum bounding rectangle of the plurality of positioning markers in the second image, based on the positions of the positioning markers in the preset coordinate system; and
   fitting the first image into the second image in the preset coordinate system based on the center and the rotation angle of the minimum bounding rectangle.

7. The processing control method according to claim 6, wherein the fitting the first image into the second image in the preset coordinate system based on the center and the rotation angle of the minimum bounding rectangle of the plurality of positioning markers in the second image comprises:
   translating the center of the first image to the center of the minimum bounding rectangle of the plurality of positioning markers in the second image; and
   rotating the first image in the preset coordinate system by the rotation angle of the minimum bounding rectangle of the plurality of positioning markers in the second image, to fit the first image into the second image in the preset coordinate system.

8. The processing control method according to claim 1, wherein the fitting the first image into the second image in the preset coordinate system based on the plurality of positioning markers in the second image comprises:

editing the first image to make the target processing pattern in the edited first image in a size scaled according to a size of the target processing pattern in the second image; and fitting the edited first image into the second image in the preset coordinate system based on the plurality of positioning markers in the second image.

9. The processing control method according to claim 1, wherein the processing the to-be-processed printed matter based on the at least part of features of the target processing pattern in the fit first image, comprises:

generating machining instructions based on the at least part of features of the target processing pattern in the fit first image and the preset coordinate system; and controlling a processing tool, according to the machining instructions, to process the to-be-processed printed matter based on the at least part of features of the target processing pattern.

10. The processing control method according to claim 1, wherein the determining the plurality of positioning markers based on the first image comprises adding the plurality of positioning markers at a periphery of the target processing pattern.

11. The processing control method according to claim 1, wherein the to-be-processed printed matter is acquired by printing the first image on which the plurality of positioning markers are determined.

12. The processing control method according to claim 1, wherein fitting the first image into the second image in a preset coordinate system comprise making the target processing pattern in the first image coincide with the target processing pattern in the second image.

13. The processing control method according to claim 1, wherein the positioning markers are in at least one of a cross shape, a triangle shape, a circle shape, and a star shape.

14. A processing device comprising:

a processing platform configured to carry a to-be-processed printed matter;

a camera configured to capture an image of the to-be-processed printed matter placed on the processing platform;

a processing tool configured to process the to-be-processed printed matter; and a controller, connected to the camera and the processing tool, wherein the controller is configured to:

acquire a first image comprising a target processing pattern;

determine a plurality of positioning markers based on the first image;

acquire the image captured by the camera, as a second image, wherein the to-be-processed printed matter is generated based on the first image and the plurality of positioning markers;

fit the first image into the second image in a preset coordinate system based on the plurality of positioning markers in the second image; and control the processing tool to process the to-be-processed printed matter based on at least part of features of the target processing pattern in the fit first image.

15. The processing device according to claim 14, wherein the processing tool comprises at least one of a cutter, a laser cutter, and a carver.

16. The processing device according to claim 14, wherein the controller is further configured to:

identify the plurality of positioning markers in the second image; and determine, based on positions where the plurality of positioning markers are located in the preset coordinate system, a position of the first image in the preset coordinate system, to fit the first image into the second image in the preset coordinate system.

17. The processing device according to claim 14, further comprising a display, wherein the display is configured to present a graphical interactive interface for user to perform at least one of: layout processing on the target processing pattern in the first image, adding the positioning markers to the first image, viewing the second image and previewing an effect image of the processed printed matter.

18. The processing device according to claim 14, further comprising a frame, wherein an enclosed processing space is defined inside the frame, the frame is provided with a top opening that is in communication with the processing space, and the frame is further connected to a cover plate which covers the opening in a rotatable manner.

19. The processing device according to claim 18, wherein a track is provided inside the frame and the processing tool is arranged on the track so that the processing tool is movable to implement processing inside the processing space along at least one of an X-axis direction, a Y-axis direction, and a Z-axis direction.

20. A non-transitory computer readable storage medium having a program stored thereon, wherein the program, when being executed by a processor, cause the processor to implement:

acquiring a first image comprising a target processing pattern;

determining a plurality of positioning markers based on the first image;

capturing an image of a to-be-processed printed matter placed on a processing platform, as a second image, wherein the to-be-processed printed matter is generated based on the first image and the plurality of positioning markers;

fitting the first image into the second image in a preset coordinate system based on the plurality of positioning markers in the second image; and processing the to-be-processed printed matter based on at least part of features of the target processing pattern in the fit first image.

\* \* \* \* \*